United States Patent [19]
Peng

[11] Patent Number: 5,615,807
[45] Date of Patent: Apr. 1, 1997

[54] CONVERTIBLE DRIPLESS CAULKING GUN FOR VARIANT VISCOSITY MEDIA

[76] Inventor: Yuenan Peng, 635 S. Pueblo Dr., Monterey Park, Calif. 91754

[21] Appl. No.: 439,706

[22] Filed: May 12, 1995

Related U.S. Application Data

[63] Continuation-in-part of Ser. No. 322,945, Oct. 12, 1994, abandoned.

[51] Int. Cl.$^6$ ..................................................... G01F 11/00
[52] U.S. Cl. ..................... 222/391; 222/153.01; 222/326
[58] Field of Search ............................. 222/153.01, 325, 222/326, 327, 386, 391

[56] References Cited

U.S. PATENT DOCUMENTS

| | | | |
|---|---|---|---|
| 1,986,166 | 1/1935 | Schneider | 18/3.5 |
| 3,894,663 | 7/1975 | Carhart et al. | 222/309 |
| 3,997,085 | 12/1976 | Lindquist | 222/326 |
| 4,009,804 | 3/1977 | Costa et al. | 222/391 |
| 4,081,112 | 3/1978 | Chang | 222/391 |
| 4,299,336 | 11/1981 | Studer | 222/80 |
| 4,356,938 | 11/1982 | Kayser | 222/327 |
| 4,461,407 | 7/1984 | Finnegan | 222/391 |
| 4,572,409 | 2/1986 | Finnegan | 222/391 |
| 4,923,096 | 5/1990 | Ennis, III | 222/391 |
| 5,058,781 | 10/1991 | Aronie et al. | 222/326 |
| 5,156,305 | 10/1992 | Eyre | 222/327 |
| 5,197,635 | 3/1993 | Chang | 222/137 |
| 5,236,105 | 8/1993 | Galex | 222/1 |
| 5,248,068 | 9/1993 | Goergen et al. | 222/326 |
| 5,390,831 | 2/1995 | Schneider | 222/391 |
| 5,501,374 | 3/1996 | Laufer et al. | 222/391 |

FOREIGN PATENT DOCUMENTS 1011470  12/1995  United Kingdom ................... 222/391

*Primary Examiner*—Joseph Kaufman
*Attorney, Agent, or Firm*—Thomas I. Rozsa; Tony D. Chen

[57] ABSTRACT

A caulking gun having a fixed first bearing surface, and an engagement member for preventing rearward movement of a plunger shaft while permitting forward movement thereof. Following termination of forward movement of the plunger shaft in response to operation of a handle mechanism of the gun, the plunger shaft selectively can be moved rearwardly a predetermined distance in response to cartridge back pressure. In an alternative mode of operation, the rearward movement is substantially prevented for effecting precise control and smoothly continuous feeding of media from the gun. In one configuration, a shifting link permits movement of the plunger shaft together with the engagement member up to a distance E when a control surface is positioned for providing forward movement of the engagement member in response to forward movement of the plunger shaft. In another configuration wherein the handle mechanism has ratcheting engagement with the plunger shaft, a counterpart of the engagement member is pivotable relative to opposite ends of a fixed pivot slot in response to positioning of the control surface.

6 Claims, 3 Drawing Sheets

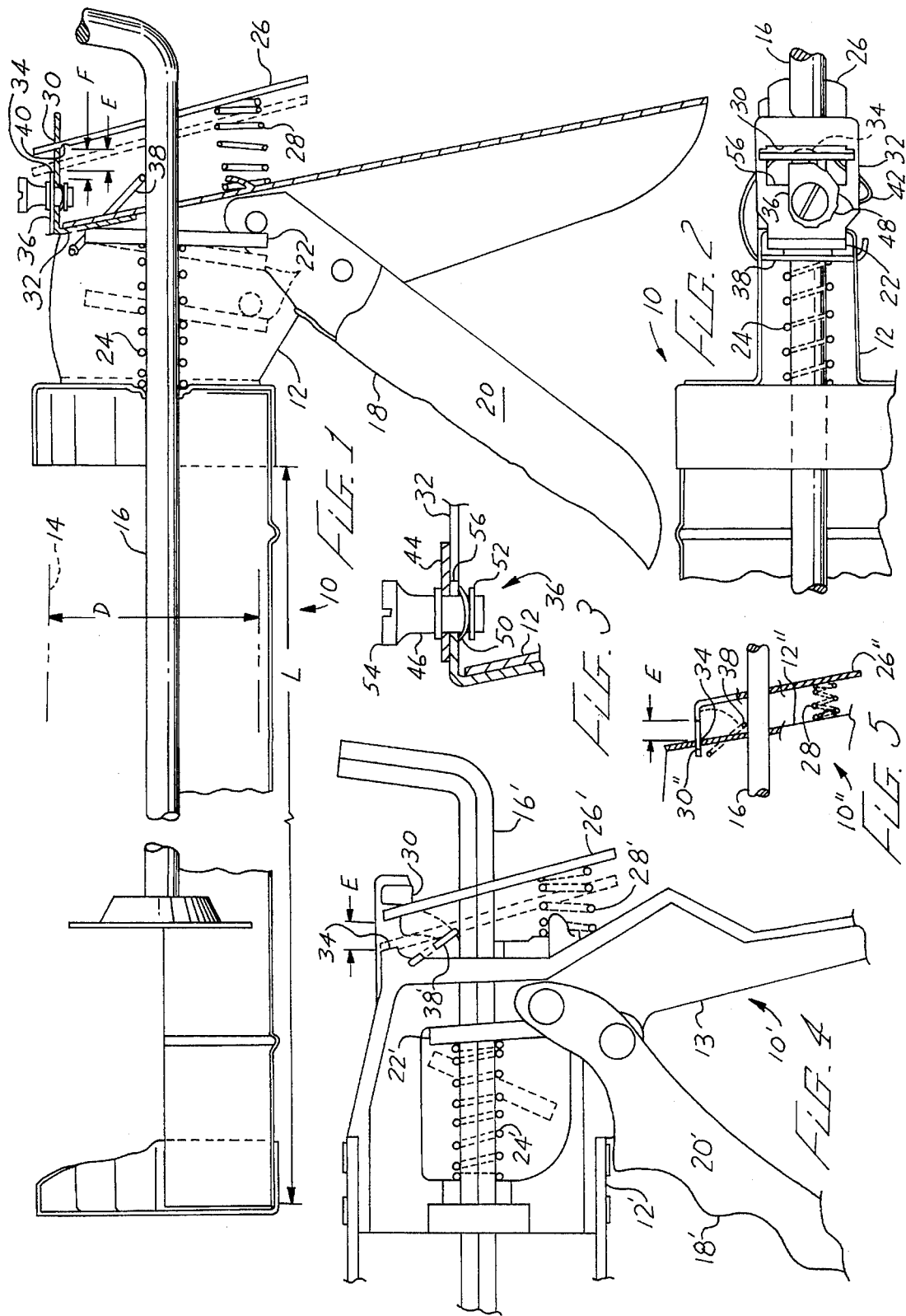

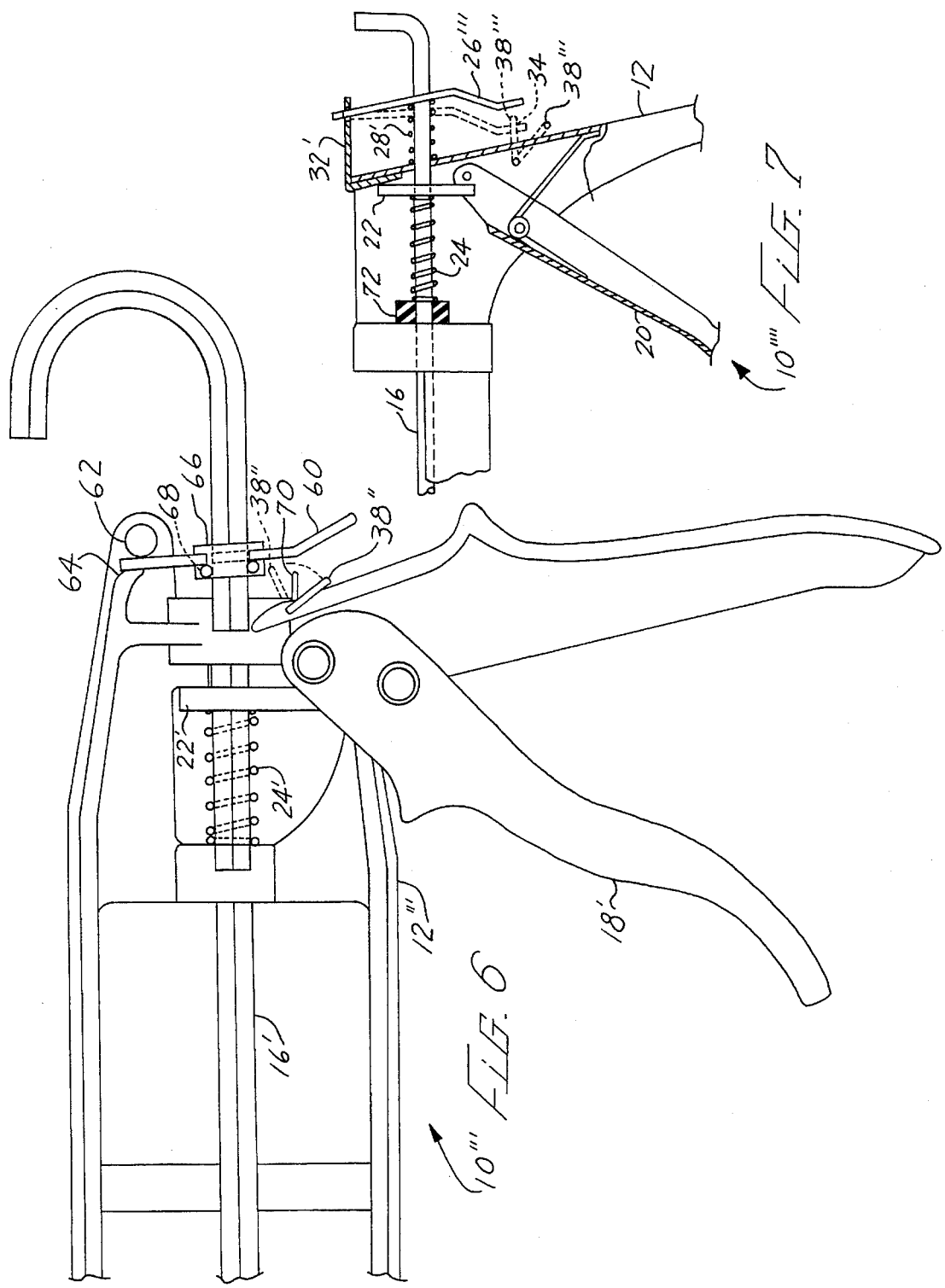

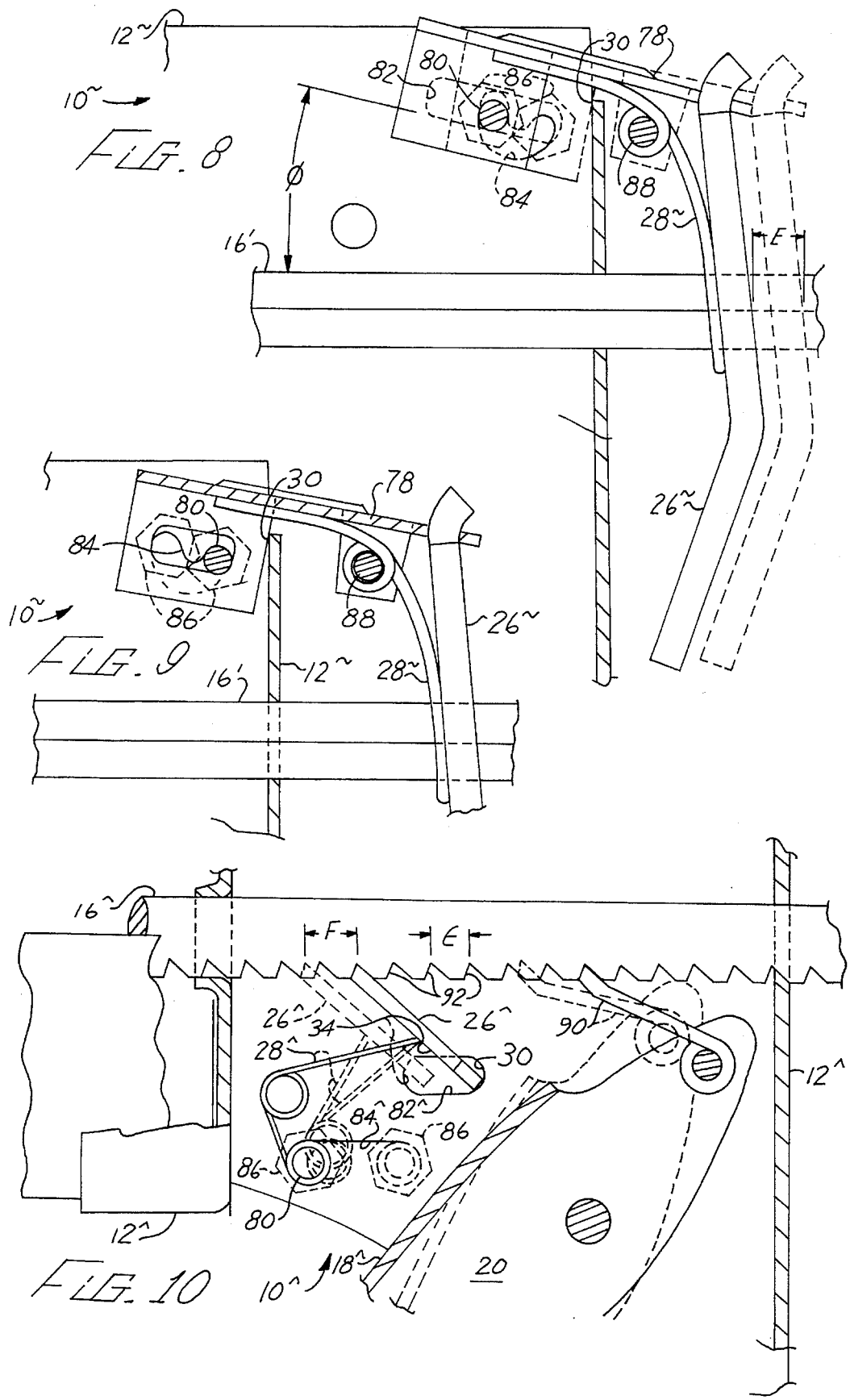

CONVERTIBLE DRIPLESS CAULKING GUN FOR VARIANT VISCOSITY MEDIA

RELATED APPLICATION

This application is a continuation-in-part of application Ser. No. 08/322,945, filed on Oct. 12, 1994, which is incorporated herein by this reference now abandoned.

BACKGROUND

The present invention relates to dispensers for caulking, sealants and the like, and more particularly to such devices providing pressure relief at the end of a dispensing cycle for avoiding spurious discharge.

Caulking guns for paste or plastic media that is typically supplied in disposable cylindrical cartridges are well known, being disclosed, for example, in U.S. Pat. No. 4,081,112 to Chang. A plunger shaft of the gun is extendable into a cartridge that is removably supported by the gun, the shaft being driven by reciprocally operating a handle mechanism for controllably dispensing the media from a nozzle of the cartridge. The drive is generally unidirectional, and principal variations of the prior art relate to operation during and following return strokes of the handle mechanism, when the plunger shaft is not being advanced.

The Chang patent discloses a gun having a drive grip that during forward movement thereof frictionally engages and forwardly drives the shaft, and a second grip that frictionally engages and holds the shaft against rearward movement, the grips being separately biased toward a gripping orientation relative to the shaft, the drive grip being upset from the gripping orientation when the handle mechanism is returned to a rest position. When it is desired to retract the plunger shaft, such as for replacing the cartridge, the second grip is manually upset from its gripping orientation. In many situations, substantial unwanted quantities of the media continue to flow from the nozzle after operation of the handle mechanism has terminated, due to swelling of the cartridge and/or deformation of the gun under high pressures needed to dispense viscous media. Such pressure can be released at least in part by releasing the second grip. However, undesirable dripping still occurs in many cases, even when a concerted effort is made to release the second grip immediately following a dispensing stroke of the handle mechanism. This is especially true at high dispensing pressures, not only because greater effort being applied to the handle mechanism cannot be as quickly terminated, but also higher forces required to release the second grip which cannot be as quickly applied as when lower pressures are involved.

Simpler dripless caulking guns not having the second grip are known. However, the complete absence of restraint during and after the return stroke is usually undesirable because there is interruption of the dispensing in each return stroke. Further, when high dispensing pressures are needed, backward motion of the plunger shaft during the return stroke can approach the distance that the shaft can be advanced in the drive stroke, thereby rendering the gun ineffective for use at high pressures. Guns for use at moderate pressures and having limited frictional restraints against rearward movement of the plunger shaft are disclosed, for example, in U.S. Pat. Nos. 4,461,407 to D. Finnigan, 4,572,409 to G. Finnigan, and 4,923,096 to Ennis. U.S. Pat. No. 4,009,804 to Costa discloses an anti-drip caulking device wherein the second grip has a spring biased, movably connected fulcrum that moves rearwardly during the return stroke of the handle mechanism for permitting a corresponding rearward movement of the plunger shaft to release pressure from the cartridge. Each of these devices of the prior art are yet subject to one or more of the following disadvantages:

1. They cannot effectively feed highly viscous media due to excessive lost motion during the backstroke;
2. They cannot provide substantially continuous flow during multiple strokes of the handle mechanism, particularly at medium and high media viscosities;
3. They are subject to spurious dispensing, particularly at low media viscosities; and
4. They are subject to performance degradations due to ageing and/or contamination of elastomer materials used therein.

Thus there is a need for a caulking gun that is effective over a wide range of media viscosities, that can deliver a substantially continuous stream during multiple cycles of the handle mechanism, is inexpensive to provide and easy to use while offering close control without spurious dispensing.

SUMMARY

The present invention meets this need. In one aspect of the invention, the caulking gun includes a frame for receiving a supply of caulking material; a plunger shaft axially movable in the frame for forwardly urging the caulking material from the gun; a handle mechanism movably supported on the frame and operatively connected for engaging and forwardly advancing the plunger shaft in response to reciprocal operation of the handle mechanism, the handle mechanism having a released condition for permitting rearward movement of the plunger shaft; an engagement member movably supported relative to the frame and having a first orientation for gripping the plunger shaft and preventing rearward movement of the shaft relative to the engagement member while permitting forward movement of the plunger shaft relative to the engagement member, and a second orientation for permitting free axial movement of the plunger shaft relative to the engagement member; means for biasing the engagement member toward the first orientation in contact with the plunger shaft; a first bearing surface fixably located relative to the frame for preventing rearward movement of the engagement member in the first orientation thereof and a control surface movably located relative to the frame for preventing forward movement of the engagement member in the first orientation thereof, the control surface being locatable sufficiently spaced from the first bearing surface to selectively permit rearward movement of the plunger shaft by a predetermined distance E upon return of the handle mechanism to the released condition when the engagement member in the first orientation thereof is contacting the control surface.

The caulking gun can include a lock member having a first unlocked position and a second locked position, the control surface in the locked position thereof restricting the rearward movement to less than the distance E. The control surface can be fixably located relative to the frame in the unlocked position of the lock member. The predetermined rearward movement in the locked position of the lock member can be less than approximately 10 percent of the predetermined rearward movement in the unlocked position. Preferably the lock member in the locked position substantially prevents rearward movement of the plunger shaft upon return of the handle mechanism to the released condition for enhanced smoothness and control of the dispensing. Preferably the distance E is at least approximately 0.1 inch. The means for biasing the engagement member toward the first orientation can include a retainer spring extending between the frame and the engagement member opposite the plunger shaft from the first bearing surface.

In another aspect of the invention, the caulking gun includes the frame; the plunger shaft; the handle mechanism; the engagement member; the means for biasing the engagement member toward the first orientation in contact with the plunger shaft; the first bearing surface; a control surface movably located relative to the frame for selectively providing forward movement of the engagement member in the first orientation thereof relative to the first position thereof in response to forward movement of the plunger shaft; and means for permitting rearward movement of the plunger shaft in response to a predetermined force that is produced by pressure within the supply of caulking material upon return of the handle mechanism to the released condition when the control surface is permitting rearward movement of the plunger shaft.

The caulking gun can further include a shifting link movably connected between the engagement member and the frame for permitting movement of the plunger shaft together with the engagement member in the first orientation thereof up to a distance E when the control surface is positioned for providing the forward movement of the engagement member in response to forward movement of the plunger shaft, and wherein the means for permitting rearward movement of the plunger shaft in response to the predetermined force comprises means frictionally engaging the shifting link. The caulking gun can include a shift rod movably connected between the shifting link and the frame through a pair of link slots on the shifting link and a pair of shift slots on the frame, the shift rod providing the control surface being selectively movable between end extremities of the shift slots. The means for biasing the engagement member and the means frictionally engaging the shifting link can include a torsion spring member connected to the shifting link, one extremity of the torsion spring member contacting the engagement member for biasing the engagement member, an opposite extremity of the torsion spring contacting the shifting link for biasing the shifting link into frictional contact with the shift rod.

The handle mechanism can include first and second ratchet members sequentially engaging an array of discontinuities on the plunger shaft, the first ratchet member being coupled to a handle member for reciprocal operation thereby, the second ratchet member being pivotably supported about a first position relative to the frame for permitting rearward movement of the plunger shaft up to a distance less than a spacing between adjacent discontinuities being engaged by the second ratchet member when the handle mechanism is returned to the released position, and about a second position for permitting rearward movement of the plunger shaft up to a distance greater than the spacing between the adjacent discontinuities when the handle mechanism is returned to the released position. The second ratchet member can be pivotably supported by a pair of pivot slots on the frame, the pivot slots being oriented approximately parallel to the plunger shaft, the first and second positions about which the second ratchet member pivots being relative to opposite extremities of the pivot slots. The caulking gun can include a shift rod movably supported by a pair of shift slots on the frame, an over-center compression spring extending between the shift rod and the second ratchet member.

DRAWINGS

These and other features, aspects, and advantages of the present invention will become better understood with reference to the following description, appended claims, and accompanying drawings, where:

FIG. 1 is a fragmentary sectional elevational view of a caulking gun according to the present invention;

FIG. 2 is a partial plan view of the gun of FIG. 1;

FIG. 3 is sectional elevational detail view of a portion of the gun of FIG. 1;

FIG. 4 is a partial side elevational view showing an alternative configuration of the gun of FIG. 1;

FIG. 5 is a partial side elevational view showing another alternative configuration of the gun of FIG. 1;

FIG. 6 is a partial side elevational view showing another alternative configuration of the gun of FIG. 1;

FIG. 7 is a partial side elevational view showing yet another alternative configuration of the gun of FIG. 1;

FIG. 8 is a partial side elevational view showing still another alternative configuration of the gun of FIG. 1, in a first operational mode;

FIG. 9 is a detail view of the gun of FIG. 8, in a second operational mode.: and FIG. 10 is a partial side elevational view showing an alternative configuration of the gun of FIG. 8.

DESCRIPTION

The present invention is directed to a caulking gun that is particularly versatile for providing smoothly continuous feeding during long runs while permitting the feeding to be cleanly and precisely terminated without spurious feeding, using media having a wide range of viscosities. With reference to FIGS. 1–3 of the drawings, a caulking gun or dispenser 10 has a frame 12 for supporting a disposable cylindrical cartridge 14 in a conventional manner, the cartridge 14 being depicted symbolically in FIG. 1 as a cylinder having an inside diameter D and a nominal length L. A plunger shaft 16 is axially movable in the frame, being driven forwardly in a conventional manner by a reciprocating handle mechanism 18 that includes a pivotally mounted handle 20, a drive grip 22 that embraces the shaft 16 and is actuated by the handle 20 against a helical drive spring 24 that is coaxial with the shaft 16. In a relaxed position of the handle 20 as shown by solid lines in FIG. 1, an upper extremity of the drive grip 22 contacts a portion of the frame 12, being upset or released from a gripping orientation that is indicated in FIG. 1 by dashed lines corresponding to an advanced position of the drive grip 22. A second or retainer grip 26 also embraces the plunger shaft 16 for engagement thereof, being biased into gripping relation thereto by a retainer spring 28 that is offset from the shaft 16, the retainer grip 26 being supported against rearward movement of the shaft 16 by a bearing or first stop surface 30. In the exemplary configuration of the dispenser 10 shown in FIGS. 1–3, the first stop surface 30 is fixedly located relative to the frame 12, being formed on a bracket 32 that is attached to the frame in a suitable manner such as by welding.

According to the present invention, the retainer grip 26 is selectively permitted to move forwardly from the first stop surface 30 by a distance E while remaining in its gripping orientation when the plunger shaft is driven by the handle mechanism 18, the gripping orientation being maintained by the retainer spring 28 acting in offset relation to (below) the shaft 16. Thus, upon relaxation of the handle mechanism 18, the plunger shaft is transported rearwardly by the combination of the retainer grip 26 and the retainer spring 28, until the grip 26 again contacts the first stop surface 30. The distance E is defined by a spacing forwardly of the retainer grip 26, when same is contacting the first stop surface, to a control surface 34 that is variably located as described herein. Accordingly, following activation of the handle mechanism 18 sufficient to advance the plunger shaft 16 a distance equal or greater than the distance E, the shaft 16 retracts by the distance E upon relaxation of the handle mechanism 18 for controllably relieving pressure within the cartridge 14, thereby preventing spurious feeding (dripping) of media therefrom.

As shown in FIGS. 1–3, an adjustment cam assembly 36, further described below, is rotatably mounted to the bracket 32 for setting the distance E as desired. Also, a lock member 38 is pivotally supported by the frame 12 between an unlocked first position as shown by solid lined in FIG. 1 and a locked second position as shown by solid lines in FIG. 2. In the second position, the lock member 38 releasably engages a notch surface 40 that is formed in the retainer grip 26. The lock member 38, having a handle extremity 42 that extends to one side of the retainer grip 26 for convenient manual movement between the first and second positions, advantageously provides sufficient spring pressure against the retainer grip 26 in the second locked position to hold the retainer grip 26 in contact with the first stop surface 30 during operation of the handle mechanism 18, thereby avoiding backlash of the retainer grip 26 when it is desired that the distance E be zero. Such is the case, for example, when viscous media is being dispensed from the cartridge 14 in a long run that requires multiple actuations of the handle 20. By preventing backlash between the retainer grip 26 and the frame 12, the lock member 38 enables very fine control of the volume of media being dispensed from the dispenser 10, which can be effected by small reciprocal movements of the handle 20. Also, when viscous media is being dispensed at elevated pressures, the handle 20 can be very quickly recycled from a partially or fully activated position for further advancement of the plunger shaft 16.

In operation of the dispenser 10, the lock member 38 is preferably placed initially in the locked second position for providing enhanced control and smoothly continuous dispensing on runs requiring multiple activations of the handle mechanism 18 as described above. When approaching a terminus of the run, the lock member 38 is preferably placed in the unlocked first position during a final drive stroke of the handle 20, thereby effecting the rearward movement of the plunger shaft 16 by the distance E upon relaxation of the handle mechanism 18 for relieving pressure within the cartridge 14 to prevent spurious delivery of the media.

As best shown in FIGS. 2 and 3, the adjustment cam assembly 36 includes a cam plate 44 that is affixed to a cam shaft 46 for rotation therewith, the camshaft 46 being rotatably supported by the bracket 32. A cam profile 48 of the cam plate 44 is formed with a graduated series of flat segments that are sequentially radially spaced from the camshaft 46 for variably setting the distance E. The cam assembly 36 also includes a spring washer 50 and a retainer ring 52 for frictionally maintaining the cam plate 44 in a selected rotational orientation on the bracket 32, an upper extremity of the shaft 46 being formed with a knob 54 for setting the position, the control surface 34 being formed by whichever segment of the cam profile 48 faces the retainer grip 26. When the lock member 38 is in the locked second position as shown in FIG. 2, the control surface 34 is located on the lock member 38 in contact with the notch surface 40. The bracket 32 is formed with an opening 56 that extends a distance F from the retainer grip 26 opposite the first stop surface 30 the distance F being not less than the maximum setting of the distance E to the profile 48.

The distance E is preferably set for a desired rearward movement of the plunger shaft 16 for effecting a desired relief of pressure within the cartridge 14 when the trigger mechanism 18 is inactivated. It is believed that sufficient pressure release occurs with the distance E settable to about 5% of the diameter D. For example, one standard configuration of the cartridge 14 has the diameter D being approximately 2 inches, the length L being about 8 inches. The distance E, at 5% of the diameter D, is thus 0.1 inch, which is believed to satisfactorily relieve pressure within the cartridge 14 for media therein having moderate viscosity. Preferably the distance E can range from approximately 2.5% to approximately 10% of the diameter D when the lock member 38 is in the first unlocked position—from approximately 0.05 inch to approximately 0.2 inch for the above example. More preferably, the distance E can be as great a approximately 15% of the diameter D, about 0.3 inch in the above example, for satisfactory pressure relief when using highly viscous media that must be dispensed using high pressure.

With further reference to FIG. 4, the present invention is applicable to a variety of caulking gun construction configurations. As shown in FIG. 4, a dispenser 10' has a frame 12' that includes a die cast member 13 that forms a stationary portion of a handle mechanism 18' having a cast handle 20', rather than formed sheet metal as in the configuration of FIGS. 1–3. The dispenser 10' also includes a plunger shaft 16' that is axially slidably movable in the die cast member 13, a drive grip 22', a drive spring 24', a retainer grip 26', a retainer spring 28', and a lock member 38' the primed designations referring to functional counterparts of like-numbered components of the dispenser 10 of FIGS. 1–3. The dispenser 10' is shown without a counterpart of the cam assembly 36, the control surface 34 being defined at a single fixed location on the die cast member 13 when the lock member 38' is in the first unlocked position.

With further reference to FIG. 5, another alternative configuration of the dispenser, designated 10", has an L-shaped counterpart of the retainer grip, designated 26", that protrudes a counterpart of the frame, designated 12", a counterpart of the first stop surface, designated 30" being formed on an inside surface of the frame 12". When the lock member 38 is in the first unlocked position, the control surface 34 is located on the outside of the frame 12" opposite the first stop surface 30". Thus the bracket 32 of FIGS. 1–3 can be considered as being formed integrally with the frame 12.

With further reference to FIG. 6, yet another application of the present invention is to a dripless caulking gun having a resilient member providing the retainer grip. As shown in FIG. 6, a dispenser 10''' having a frame 12''' and counterparts of the plunger shaft 16' and the handle mechanism 18' of FIG. 4 includes a retainer grip 60 that is located for pivotal movement between a boss 62 of and a rib 64 the frame 12''', the retainer grip 60 carrying a holder member 66 that holds a resilient O-ring 68 in frictional contact with the plunger shaft 16' for urging the retainer grip 60 to move in unison with the plunger shaft 16'. Thus, when the handle mechanism 18' begins to advance the plunger shaft, the retainer grip 60 pivots out of gripping engagement with the plunger shaft 16' until the retainer grip 60 contacts a stop member 70 that is formed in the frame 12''', the retainer grip 60 being held against the stop member 70 during further advancement of the plunger shaft 16' by the frictional engagement with the O-ring 68. Thus, upon termination of dispensing and relaxation of the handle mechanism 18', the retainer grip 60 pivots rearwardly, being carried together with plunger shaft

16' by continued frictional engagement by the O-ring 68, until the retainer grip 60 again attains gripping contact with the plunger shaft 16', thereby preventing further rearward movement of the plunger shaft. As thus far described, the dispenser 10''' is available as Wexford 2 automatic pressure release caulking gun disclosed in UK Registered Design. No. 1,013,241. According to the present invention, a counterpart of the lock member 38, designated 38", is pivotally supported by the frame 12''' for movement between the first unlocked position and the second locked position, the lock member 38" in the locked position bearing against the retainer grip 60 opposite the boss 62 for holding the retainer grip 60 in the gripping orientation during forward movement of the plunger shaft 16'. The lock member 38" is preferably formed of a high strength spring material for permitting the retainer grip 60 to be manually disengaged from the gripping orientation in a conventional manner when, for example, it is desired to replace the cartridge 14. Thus the lock member 38" must be sufficiently strong to overcome the frictional forces of the O-ring 68, yet sufficiently flexible to permit manual release of the retainer grip 60 without permanent deformation of the lock member 38". Accordingly, the dispenser 10''' of the present invention provides close control and smoothly continuous dispensing with the lock member 38" in the second locked position, and with the lock member 38" in the first unlocked position a predetermined rearward movement of the plunger shaft 16' for pressure relief following termination of dispensing.

With further reference to FIG. 7, yet another configuration of the dispenser, designated dispenser 10'''', includes counterparts of the frame 12, the plunger shaft 16, the pivotable handle 20, the drive grip 22, and the drive spring 24. A counterpart of the retainer grip, designated 26''', is pivotally supported above the plunger shaft 16 by a bracket 32', a counterpart of the retainer spring, designated 28', encloses the plunger shaft 16 between the frame 12 and the retainer grip 26'''. According to the present invention, a counterpart of the lock member 38, designated 38''', is pivotally connected to the frame 12 for selectively locking the retainer grip 26''' out of gripping engagement with the plunger shaft 16, and a resilient sleeve 72 is interposed between the frame 12 and the drive spring 24 for frictionally engaging the plunger shaft 16. The lock member 38''' in a disengaged position thereof permits the retainer spring 28' to hold the retainer grip 26''' in gripping relation with the plunger shaft 16 as indicated by solid lines in FIG. 7. In an engaged position of the lock member 38''', the retainer grip 26''' is moved forwardly, being pivoted from gripping contact with the plunger shaft 16 for permitting the plunger shaft 16 to be moved rearwardly in response to a predetermined back pressure within the cartridge 14 when the handle 20 is restored to its inactive position. The engaged position of the lock member 38''' corresponds to the first position of the lock member 38 in the configuration of FIGS. 1–3, the disengaged position of the lock member 38''' corresponding to the second position of the lock member 38. The pressure and corresponding force required for rearward movement of the plunger shaft 16 is established by a suitable interference fit between the resilient sleeve 72 and the plunger shaft 16. Thus the control surface 34 is located on the lock member 38''' in the first position thereof, the control surface 34 being located on the inside of the sleeve 72 in the second position of the lock member 38'''.

With further reference to FIGS. 8 and 9, still another configuration of the dispenser, designated dispenser 10⁻, includes counterparts of the frame, designated 12⁻, the plunger shaft 16', and the retainer grip, designated 26⁻. Not shown are counterparts of the pivotable handle 20, the drive grip 22', and the drive spring 24. In the configuration of FIGS. 8 and 9, the drive grip 22' can be inverted on the shaft 16' the handle 20 being extended above the shaft 16', and the drive spring 24 can also be located above the shaft 16'. According to this aspect of the present invention, the retainer grip 26⁻ is pivotally supported above the plunger shaft 16' by a shifting link 78, the link 78 being connected to the frame 12⁻ by a laterally disposed shift rod 80 that protrudes a pair of link slots 82 of the link 78 and a pair of U-shaped shift slots 84 that are formed in the frame 12⁻. Each end of the shift rod 80 is provided with an acorn nut 86 for axially retaining the rod 80, the nuts 86 serving as handles for shifting the rod 80 between opposite extremities of the shift slots 84, the rod 80 being shifted forwardly in FIG. 8 for dripless operation of the dispenser 10⁻, and rearwardly in FIG. 9 for avoiding backlash of the retainer grip 26⁻ when it is desired that the distance E be substantially zero as discussed above. A counterpart of the retainer spring, designated 28⁻, is connected to the link 78 by a transversely disposed anchor pin 88 that is attached to the shifting link 78, the spring 28⁻ biasing a lower portion of the retainer grip 26⁻ rearwardly as before, and biasing a forward portion of the shifting link 78 upwardly against the shift rod 80. In the forward position of the shift rod 80 as shown in FIG. 8, the shifting link moves forwardly relative to the frame 12⁻ in response to forward movement of the plunger shaft 16' (described above) until further movement of the shifting link 78 is blocked by rear extremities of the link slots 82 contacting the shift rod 80, a lower side of each link slot contacting the shift rod 80 at a ramp angle $\phi$. The upward biasing against the shift rod 80 by the spring 28⁻ serves to releasably hold the rod 80 at a selected extremity of the shift slots 84, and further to impart a desired amount of frictional resistance to sliding contact between the lower sides of the link slots 82 and the shift rod 80, thereby permitting the plunger shaft 16' to be moved rearwardly up to the distance E in response to a predetermined back pressure within the cartridge 14 when the handle 20 is restored to its inactive position. The pressure and corresponding force required for rearward movement of the plunger shaft 16' is established by suitably selecting the angle $\phi$ in combination with the upward biasing of the shifting link 78 against the shift rod 80. The angle $\phi$ is effective for overcoming a portion of the frictional resistance to rearward movement of the shifting link 78 that is imparted by the retainer spring 28⁻. The angle $\phi$ can be as great as approximately 15° for overcoming nearly all of the frictional resistance, being preferably approximately 13.5° in a preferred configuration of the dispenser 10⁻. Significant compensation of the frictional resistance is produced when the angle $\phi$ is at least approximately 15°, a preferred range being from approximately 13° to approximately 14° for producing rearward movement of the plunger shaft 16' only to the extent back pressure continues to exist within the cartridge 14. As discussed above, the angle $\phi$ is measured at the forward position of the shifting link 78. It will be understood that the actual contact angle decreases slightly as the shifting link 78 moves rearwardly, from approximately 13.5° to approximately 12.5° in the configuration of FIGS. 8 and 9.

As shown in FIG. 9, a counterpart of the first stop surface 30 is located on the frame 12⁻ for contacting a rearwardly facing surface of the shifting link 78 for substantially preventing the shifting link 78 from slidably engaging the shift rod 80. Thus the shift rod 80 provides a counterpart of the control surface 34.

With further reference to FIG. 10, an alternative configuration of the dispenser 10⁻, designated 10^, has a counterpart of the frame 12⁻, designated 12^, and a notched counterpart of the plunger shaft 16, designated 16^, the shaft 16^ being advanced in ratchet fashion as described herein. A counterpart of the handle mechanism, designated 18^, includes the handle 20, a spring-biased drive pawl 90 being pivotably coupled thereto for engaging one of a plurality of discontinuities or notches 92 that are formed in the shaft 16^ in a conventional manner, the notches 92 being spaced along the shaft 16^ at a spacing ∈. According to this aspect of the present invention, a counterpart of the retainer grip, designated retainer member 26^, is pivotably supported in counterparts of the link slots, designated pivot slots 82^, that are formed in the frame 12^, the retainer member 26^ being pivotable selectively in at least two locations relative to the frame 12^. A counterpart of the retainer spring 28⁻, designated 28^, is movably anchored relative to the frame 12^ on a counterpart of the shift rod 80, the shift rod 80 extending through counterparts of the shift slots, designated 84^, that are formed in the frame 12^, the shift rod 80 having counterparts of the acorn nuts 86 thereon. The shift slots 84^ can be straight and horizontally disposed as shown in FIG. 10 in that the spring 28^ pops over-center when the shift rod 80 is moved between opposite extremities of the shift slots 84^, the spring 28^ also biasing the retainer member 26^ into engagement with the notches. When the shift rod 80 is moved to a front extremity of the shift slots 84^, the retainer member 26^ is maintained against rearward extremities of the pivot slots 82^ as shown by solid lines in FIG. 10. Thus the rearward extremities of the pivot slots 82^ provide counterparts of the stop surface 30, and surfaces of the retainer spring 28^ engaging the retainer member 26^ provides a counterpart of the control surface 34. Accordingly, in the forward position of the shift rod 80, the dispenser 10^ operates in a conventional mode, the plunger shaft 16^ being permitted to move rearwardly by a backlash distance that is from approximately zero to a distance less than the spacing ∈ in response to rearward pressure against the plunger shaft 16^ when the handle mechanism 18^ is returned to the released position.

When the shift rod 80 is moved to a rear extremity of the shift slots 84^, the retainer member 26^ is biased against forward extremities of the pivot slots 82^ as shown by dashed lines in FIG. 10. Thus the forward extremities of the pivot slots 82^ provide counterparts of the control surface 34. Accordingly, in the rearward position of the shift rod 80, the dispenser 10^ operates in a dripless manner, the plunger shaft 16^ being permitted to move rearwardly by a distance F in addition to the backlash distance that is associated with the conventional mode of operation of the dispenser 10^. As shown in FIG. 10, the distance F is greater than the spacing ∈, a typical value of the spacing ∈ being approximately 0.16 inch. It will be understood that the backlash distance can be varied by appropriately locating rearward extremities of the pivot slots 82^ relative to the handle mechanism 18^.

Although the present invention has been described in considerable detail with reference to certain preferred versions thereof, other versions are possible. For example, The plunger shaft 16' in the configuration of FIGS. 8 and 9 can be formed round in the manner of the shaft 16 of FIG. 1. Also in FIG. 8, a notched counterpart of the plunger shaft can be substituted for operation by a ratchet mechanism as in FIG. 10. Therefore, the spirit and scope of the appended claims should not necessarily be limited to the description of the preferred versions contained herein.

What is claimed is:

1. A caulking gun comprising:

(a) a frame for receiving a supply of caulking material;

(b) a plunger shaft axially movable in the frame for forwardly urging the caulking material from the gun;

(c) a handle mechanism movably supported on the frame and operatively connected for engaging and forwardly advancing the plunger shaft in response to reciprocal operation of the handle mechanism, the handle mechanism having a released position for permitting at least some rearward movement of the plunger shaft, the handle mechanism further including first and second ratchet members sequentially engaging an array of discontinuities on the plunger shaft, the first ratchet member being coupled to a handle member for reciprocal operation thereby, the second ratchet member being pivotably supported about a first position relative to the frame for permitting rearward movement of the plunger shaft up to a distance less than a spacing between adjacent discontinuities being engaged by the second ratchet member when the handle mechanism is returned to the released position, and about a second position for permitting rearward movement of the plunger shaft up to a distance greater than the spacing between the adjacent discontinuities when the handle mechanism is returned to the released position;

(d) an engagement member movably supported relative to the frame and having a first orientation for gripping the plunger shaft and preventing rearward movement of the shaft relative to the engagement member while permitting forward movement of the plunger shaft relative to the engagement member, and a second orientation for permitting free axial movement of the plunger shaft relative to the engagement member;

(e) means for biasing the engagement member toward the first orientation in contact with the plunger shaft;

(f) a first bearing surface fixably located relative to the frame for preventing rearward movement of the engagement member in the first orientation thereof relative to a first position thereof;

(g) a control surface movably located relative to the frame for selectively providing forward movement of the engagement member in the first orientation thereof relative to the first position thereof in response to forward movement of the plunger shaft; and (h) means for permitting rearward movement of the plunger shaft in response to a predetermined force that is produced by pressure within the supply of caulking material upon return of the handle mechanism to the released position when the control surface is permitting rearward movement of the plunger shaft.

2. The caulking gun of claim 1, further comprising: a shifting link movably connected between the engagement member and the frame for permitting movement of the plunger shaft together with the engagement member in the first orientation thereof up to a distance E when the control surface is positioned for providing the forward movement of the engagement member in response to forward movement of the plunger shaft, and wherein the means for permitting rearward movement of the plunger shaft in response to the predetermined force comprises means frictionally engaging the shifting link.

3. The caulking gun of claim 2 comprising:

a shift rod movably connected between the shifting link and the frame through a pair of link slots on the shifting link and a pair of shift slots on the frame, the shift rod providing the control surface being selectively movable between end extremities of the shift slots.

4. The caulking gun of claim 3 wherein the means for biasing the engagement member and the means frictionally engaging the shifting link comprises a torsion spring member connected to the shifting link, one extremity of the torsion spring member contacting the engagement member for biasing the engagement member, an opposite extremity of the torsion spring contacting the shifting link for biasing the shifting link into frictional contact with the shift rod.

5. The caulking gun of claim 1, wherein the second ratchet member is pivotably supported by a pair of pivot slots on the frame, the pivot slots being oriented approximately parallel to the plunger shaft, the first and second positions about which the second ratchet member pivots being relative to opposite extremities of the pivot slots.

6. The caulking gun of claim 5, further comprising a shift rod movably supported by a pair of shift slots on the frame, and an over-center compression spring extending between the shift rod and the second ratchet member.

* * * * *